United States Patent
Richerson et al.

(10) Patent No.: US 6,328,778 B1
(45) Date of Patent: Dec. 11, 2001

(54) FILTER APPARATUS

(75) Inventors: Shaun Richerson, Madill, OK (US); Francois Lautens, Etoy (CH)

(73) Assignee: Andreae Filters, Inc., Ardmore, OK (US)

( * ) Notice: Subject to any disclaimer, the term of this patent is extended or adjusted under 35 U.S.C. 154(b) by 0 days.

(21) Appl. No.: 09/283,403

(22) Filed: Apr. 1, 1999

(51) Int. Cl.⁷ .............................. B01D 29/56; B01D 29/07
(52) U.S. Cl. ............................ 55/475; 55/482; 55/496; 55/497; 55/511; 55/521; 55/DIG. 31
(58) Field of Search .......................... 55/475, 482, 488, 55/489, 496, 521, DIG. 46, DIG. 31, 511, 497, 500

(56) References Cited

U.S. PATENT DOCUMENTS

| | | | |
|---|---|---|---|
| 3,075,337 | 1/1963 | Andreae | 55/446 |
| 3,440,807 | * 4/1969 | Gaines, Jr. | 55/475 |
| 3,620,375 | 11/1971 | Atkins | 210/484 |
| 4,008,060 | 2/1977 | Andreae | 55/446 |
| 5,051,118 | 9/1991 | Andreae | 55/97 |
| 5,059,218 | 10/1991 | Pick | 55/131 |
| 5,145,500 | 9/1992 | Nolan, Jr. | 55/501 |
| 5,252,111 | 10/1993 | Spencer et al. | 55/489 |
| 5,273,564 | 12/1993 | Hill | 55/493 |
| 5,743,927 | 4/1998 | Osendorf | 55/497 |
| 5,779,747 | 7/1998 | Schlör et al. | 55/497 |
| 6,126,707 | * 10/2000 | Pitzer | 55/495 |

FOREIGN PATENT DOCUMENTS

| | | | |
|---|---|---|---|
| 454584 | * 2/1949 | (CA) | 55/489 |
| 3545422 | * 7/1987 | (DE) | 55/DIG. 31 |

OTHER PUBLICATIONS

Brochure of Andreae Filters, Inc. entitled "Andreae® Standard Andreae® HE+ Andreae® Hydro Filters" (undated but admitted to be prior art).

* cited by examiner

*Primary Examiner*—Robert A. Hopkins
(74) *Attorney, Agent, or Firm*—McAfee & Taft

(57) ABSTRACT

The invention provides a filter apparatus for removing air entrained particles comprising a collapsible filter media. The filter media has a periphery. A continuous frame extends around and attaches to the periphery of the filter media whereby the filter media and attached frame together can be lengthwise collapsed.

30 Claims, 2 Drawing Sheets

FILTER APPARATUS

BACKGROUND OF THE INVENTION

This invention relates generally to filters and more particularly, but not by way of limitation, to collapsible filter apparatus for removing particulates from an airstream adapted for use in a paint booth.

Filters, including air filters, are used for a variety of applications. Generally, an air filter fits in a housing and has a filter media which removes undesired particles from a fluid, typically an airstream. Depending on its specific application, the filter media is adapted to remove dust, dirt, paint, fumes and/or other particles.

In paint booths, i.e., paint overspray control or paint arrester applications, a filter is placed in the exhaust airstream of the paint booth or similar structure. Paint spray residual that does not adhere to the article being painted is entrained in the airstream of the exhaust porting from the paint booth. The airstream passes through the filter positioned at an air intake before it is exhausted into the environment.

A few types of filters are commonly used in paint booths and similar applications. One is a rigid, non-collapsible, framed filter. The framed filter is designed to fit snugly in the modular frame of the exhaust airstream of the paint booth. A framed filter typically requires no clips or other additional parts to secure the filter to the modular frame of the paint booth, but does require the use of a rear supporting grid either built into the filter or placed behind the filter in the modular frame to prevent the filter from being drawn through the modular frame into the exhaust duct.

Shipping, storing and disposing non-collapsible framed filters is expensive and burdensome due to the volume of the filters. However, such volume is necessary in an expanded state in order to effectively and efficiently remove and entrain paint from an airstream.

Another type of filter which attempts to overcome these disadvantages is a frameless accordion-type filter media typically manufactured in long sections, i.e., twenty to thirty feet long, and cut to length to fit a particular modular frame of the paint booth. The expandable/collapsible filter medium is formed of paperboard, cardboard and/or honeycomb to create an inexpensive and effective filter means. The collapsible design of these filters greatly reduces the shipping, storage and disposal costs of the filter. However, the filter must be cut and a rear supporting grid typically must be used to secure the filter. Also, clips or wire fasteners must be used to secure the edges of the filter to the modular frame of the air intake.

Another attempt to overcome these disadvantages is illustrated in U.S. Pat. No. 5,252,111 to Spencer, deceased et al., which is incorporated herein by reference. This patent describes a multi-ply expandable filter media formed of honeycomb and a corresponding expandable frame. However, the frame lacks strength because it is not continuous and appears to require the use of a rear supporting grid.

Thus, there is a need for improved filter apparatus which are collapsible, expandable, strong and which do not require the use of clips or a rear supporting grid.

SUMMARY OF THE INVENTION

The present invention provides improved filter apparatus which meet the needs described above.

The invention includes filter apparatus for removing air entrained particulates comprising a collapsible filter media. The filter media has a periphery. A continuous frame extends around and attaches to the periphery of the filter whereby the filter media and attached frame together can be lengthwise collapsed.

The invention also includes a filter apparatus comprising a collapsible filter media. The filter media has a first end substantially parallel to a second end and a top substantially parallel to a bottom. The first and second ends each have an upper portion and a lower portion. The filter apparatus also has a frame for supporting the filter media. The frame has an upper frame member connecting the upper portion of the first end and the upper portion of the second end and spanning the top of the filter media. The frame has a lower frame member connecting the lower portion of the first end to the lower portion of the second end and spanning the bottom of the filter media. The frame has a plurality of fold points located on the upper frame member and on the lower frame member such that the upper frame member and the lower frame member can be folded to collapse the filter media lengthwise between the first end and the second end.

The invention further includes a filter apparatus configurable between a collapsed state and an expanded state. The filter apparatus is a corrugated filter media for removing particulates from an airstream. The filter media has a periphery comprising a first end and a second end, the filter media being collapsible between the first and second ends. The filter apparatus includes a continuous frame for supporting the filter media extending around the periphery of the filter media and connecting to the first end and the second end of the filter media. The frame has a plurality of fold points at which the frame can be folded such that the frame together with the filter media are lengthwise collapsible, whereby an overall height of the filter apparatus in the collapsed state is not significantly greater than the overall height of the filter apparatus in an expanded state.

It is therefore an general object of the present invention to provide improved filter apparatus. Other and further objects, features and advantages of the present invention will be readily apparent to those skilled in the art upon a reading of the following disclosure when taken in conjunction with the accompanying drawings.

DETAILED DESCRIPTION OF THE PREFERRED EMBODIMENTS

Figure 1:
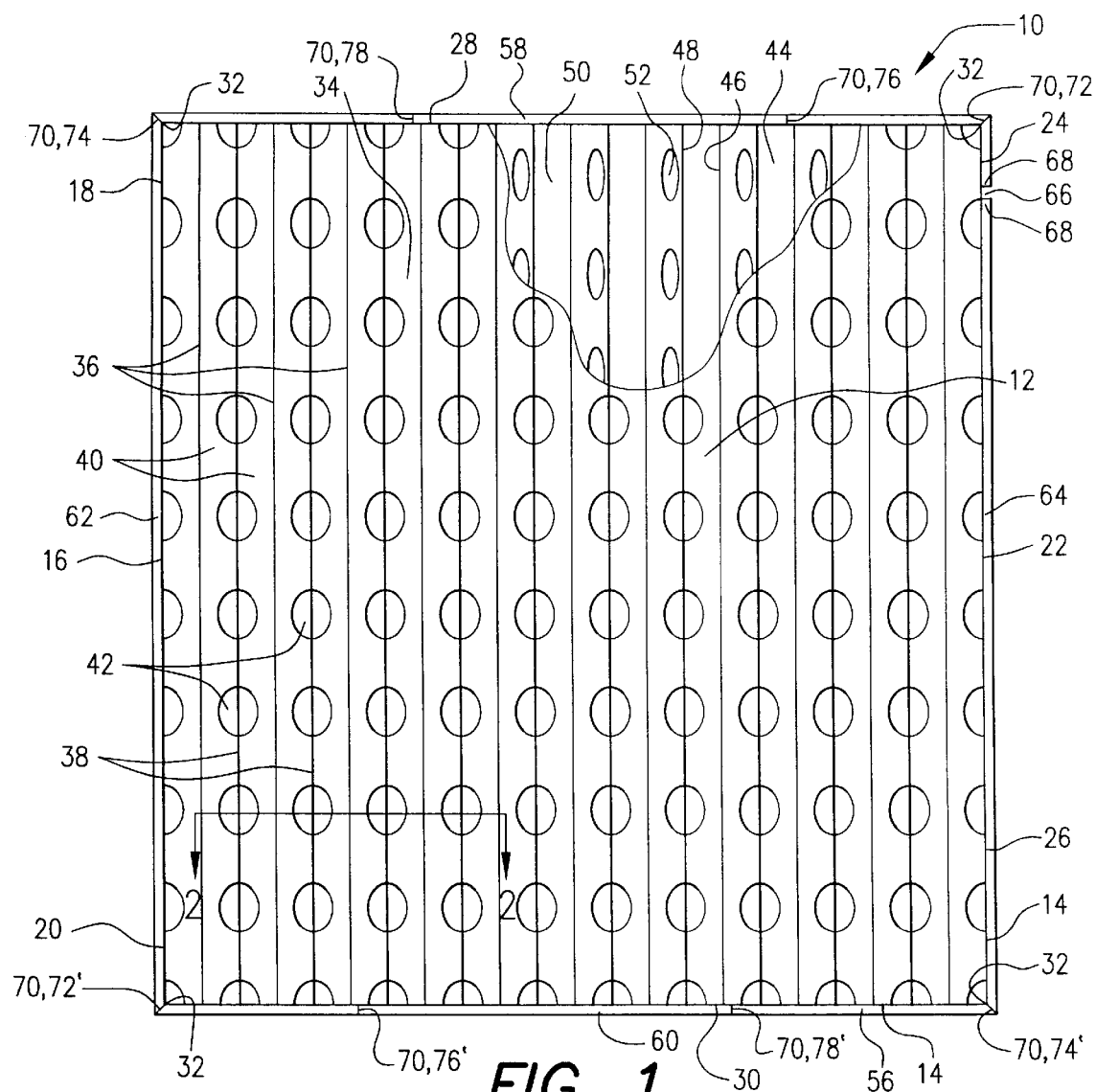
FIG. 1 is a partially cutaway front elevation view of the apparatus of the present invention shown in an expanded state.

Referring to the drawings, presently preferred embodiments of the invention and their operation are illustrated. Like reference numerals generally refer to like parts throughout the drawings and this description.

Directional terms—specifically including but not limited to upper, lower, top, bottom, upstream, downstream, left and right—have been used throughout the specification and claims. These directional terms have been used solely for clarity in describing the application and do not limit the invention to any specific orientation. In other words, filter apparatus 10 of the present invention can be rotated about any of its axes and still function as intended.

Referring to FIG. 1, the filter apparatus of the present invention is shown and designated generally by the numeral 10. Apparatus 10 has a filter media 12 for removing particulates from a fluid flow such as an airstream. Filter media 12 is preferably a rectangular shaped, multi-ply media such as that described in U.S. Pat. No. 3,075,337 to Erhard C. Andreae, which patent is incorporated herein by reference. Alternately, filter media 12 is formed as described in U.S. Pat. No. 5,051,118 to Robert Andreae, which patent is incorporated herein by reference.

Referring to FIG. 1, filter media 12 has a periphery 14. Periphery 14 includes a first end 16 which has an upper portion 18 and a lower portion 20. Periphery 14 of filter media 12 also includes a second end 22 which is substantially parallel to first end 16. Second end 22 has an upper portion 24 and a lower portion 26. Periphery 14 of filter media 12 also has a top 28 substantially parallel to a bottom 30. Opposite ends of top 28 connect with upper portion 18 of first end 16 and to upper portion 24 of second end 22, respectively. Similarly, opposite ends of bottom 30 connect to lower portion 20 of first end 16 and to lower portion 26 of second end 22, respectively. The junctions of ends 16, 22, top 28 and bottom 30 form four corners 32 at approximate right angles such that filter media 12 is substantially rectangular in shape.

Figure 2:
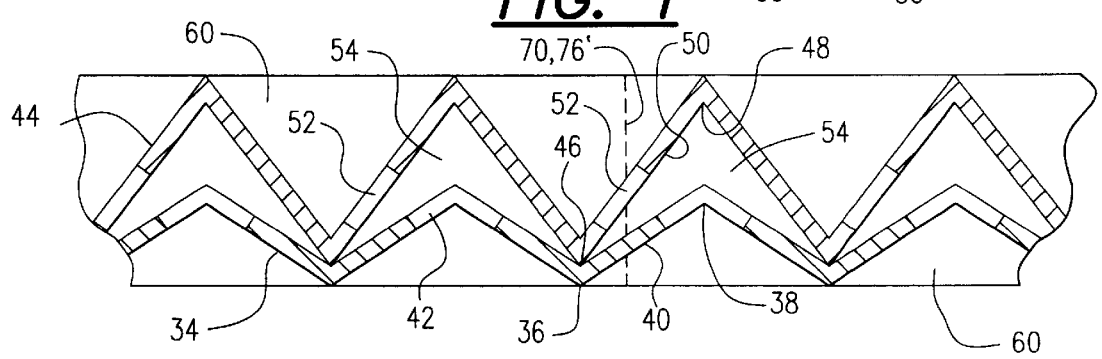
FIG. 2 is a sectional view along lines 2—2 of FIG. 1.

Referring to FIGS. 1 and 2, filter media 12 is preferably an accordion-type, multi-ply corrugated filter which separates particles from an airstream by inertia. More specifically, filter media 12 has a first media member or upstream wall 34. First media member 34 has upstream folds 36 which are substantially parallel and extend from top 28 to bottom 30 of periphery 14 of filter media 12. First media member 34 also has downstream folds 38 which are substantially parallel and extend from top 28 to bottom 30 of periphery 14 of filter media 12. First media member 34 has walls 40 extending from top 28 to bottom 30 which are the portions of first media member 34 which separates upstream folds 36 and downstream folds 38.

First media member 34 has a plurality of apertures 42 disposed in first media member. Preferably, apertures 42 are circular, are located upon downstream folds 38 and are vertically and horizontally aligned as shown in FIG. 1. Most preferably, apertures 42 are slightly offset on downstream folds 38 such that approximately 60% of an aperture 42 is positioned on one side of a downstream fold 38 and 40% of the aperture 42 is positioned on the other side of the downstream fold 38. The offset nature of apertures 42 helps to create a swirling effect which increases the efficiency of removing particles from the airstream.

Filter media 12 has a second media member or downstream wall 44 attached in complementary relationship with first media member 34. Similar to the structure of first media member 34, second media member 44 has upstream creases 46 and downstream creases 48 extending from top 28 to bottom 30. Upstream creases 46 and downstream creases 48 are separated by walls 50. Second media member 44 has holes 52 positioned on walls 50 of second media member 44, i.e., located between upstream creases 46 and downstream creases 48. As with apertures 42 of first media member 34, holes 52 of second media member 44 are aligned vertically and horizontally.

First media member 34 and second media member 44 are positioned in a complementary relationship with each other. Upstream folds 36 of first media member 34 are aligned with upstream creases 46 of second media member 44. Similarly, downstream folds 38 of first media member 34 are aligned with downstream creases 48 of second media member 44. First media member 34 of second media member 44 are attached by any suitable means including glue, staples and other bonding means. In a preferred embodiment, the front of upstream creases 46 of second media member 44 is glued to the back of upstream folds 36 of first media member 34.

In a preferred embodiment, walls 50 of second media member 44 are wider than walls 40 of first media member 34 such that V-shaped chambers 54 are created between first media member 34 and second media member 44, i.e., between walls 40 of first media member 34 and walls 50 of second media member 44.

When first media member 34 and second media member 44 are attached, apertures 42 of first media member 34 are offset from holes 52 in second media member 44. Most preferably, apertures 42 and holes 52 are offset in both vertical and horizontal directions. The offset orientation of apertures 42 and holes 52 creates a swirling effect on the particle ladened airstream such that the particles are deposited on the first and second media members 34, 44 such that substantially clean free air exits through the rear of the filter.

In a preferred embodiment, first media member 34 and second media member 44 are each formed of a single piece of two ply, 47 pound per msf (1000 square feet) paper board. In high moisture environments, 53 pound paper board forms first media member 34 and 47 pound paper board forms second media member 44. However, many materials are suitable as the filter media of the present invention, specifically including but not limited to cardboard, fiber weave, mesh, polyester, fiberglass, aluminum and combinations thereof.

In addition to first and second media members 34, 44, additional media members can be added, i.e., such as third and fourth media members to improve the efficiency of removing particles in the airstream. Any additional media members can also be formed of a variety of filter materials. In another alternate embodiment, first media member 34 is formed of paperboard as previously described and second media member 44 is formed of thin polyester material as described in U.S. Pat. No. 5,051,118.

Referring to FIG. 1, filter apparatus 10 has a frame 56 attached to periphery 14 of filter media 12. Frame 56 has an upper frame member 58 connecting upper portion 18 of first end 16 of periphery 14 of filter media 12 to upper portion 24 of second end 22 of periphery 14 of filter media 12. Similarly, frame 56 has a lower frame member 60 connecting the lower portion 20 of first end 16 of periphery 14 of filter media 12 to lower portion 26 of second end 22 of periphery 14 of filter media 12. Upper frame member 58 and lower frame member 60 span top 28 and bottom 30, respectively, of periphery 14 of filter media 12, but do not attach to top 28 or bottom 30.

Frame 56 also includes left frame member 62 and right frame member 64. Ends of left frame member 62 connect to an end of upper frame member 58 and to an end of lower frame member 60, respectively. Similarly, ends of right frame member 64 connect to an end of upper frame member 58 and to an end of lower frame member 60, respectively. In an expanded or unfolded state as shown in FIG. 1, upper frame 58 is substantially parallel to lower frame member 60. Similarly, left frame member 62 is substantially parallel to right frame member 64 such that frame 56 forms a rectangle.

Left frame member 62 is attached to first end 16 of periphery 14 of filter media 12. Similarly, right frame member 64 is attached to second end 22 of periphery 14 of filter media 12. Attachment may be accomplished by any suitable means such as gluing, tacking, bonding, stapling, etc., but preferably is attached by glue.

Preferably, frame members 58, 60, 62, 64 are formed of a single piece of 200 pound per inch, B-fluted, corrugated double-face cardboard. Most preferably, frame members 58, 60, 62, 64 form a continuous frame 56. "Continuous" as used herein means an unbroken member; however, a broken member having a gap or splice 66 interposed between or connecting adjacent ends 68 of frame 56 is included within the definition of continuous as used herein. Most preferably, ends 68 of frame 56 overlap and are glued to form the "continuous" frame 56. Overlapping ends 68 of frame 56 are preferably located either on upper frame member 58 or lower frame member 60 to create a stronger frame, as opposed to left or right frame member 62, 64. Moreover, the orientation of adjacent ends 68 proximately located and attached to filter media 12 is included within the definition of "continuous."

Figures 3, 4:
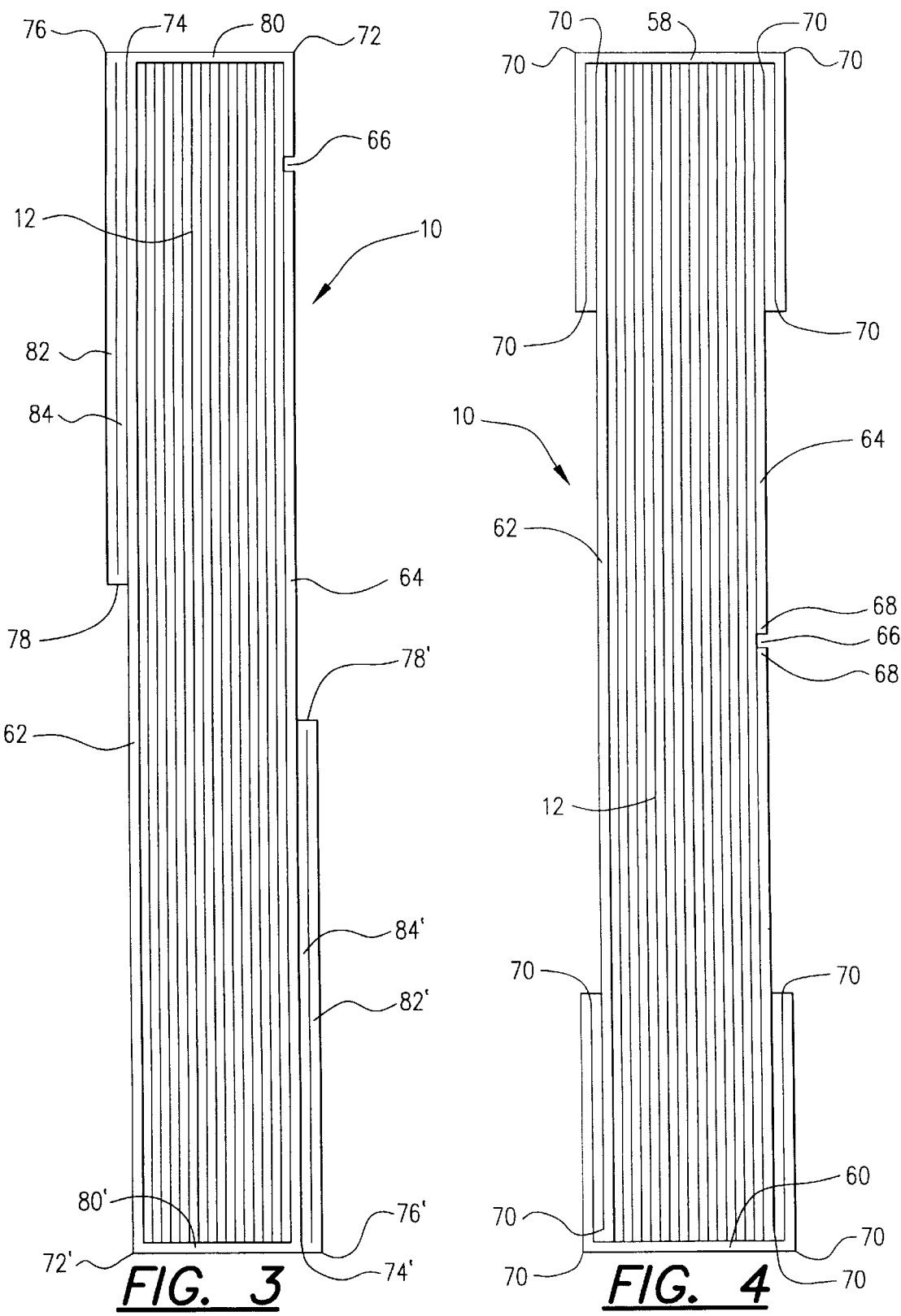
FIG. 3 is a front elevation view of the apparatus of the present invention shown in a collapsed state.
FIG. 4 is a front elevation view of an alternate embodiment of the present invention shown in a collapsed state.

Referring to FIGS. 1 and 3, frame 56 has a plurality of fold points 70 which enable frame 56 and attached filter media 12 together to be lengthwise collapsed, i.e., collapsed between left frame member 62 and right frame member 64. A "fold point" is a predetermined location at which the frame can be folded to facilitate configuring or transitioning apparatus 10 between an expanded state and a collapsed state. Preferably, fold points 70 are weakened areas in the material of frame 56. When frame 56 is formed of cardboard, fold points 70 may be created by scoring with a scoring head.

In the preferred embodiment shown in FIG. 3, fold points are positioned such that in the collapsed state each the upper frame member 58 and the lower frame member 60 forms an L-shape. In this preferred embodiment, each upper frame member 58 and lower frame member 60 has four fold points. Upper frame member 58 has a first fold point 72 located at the junction between upper frame member 58 and right frame member 64 and a second fold point 74 located at the junction of left frame member 62 and upper frame member 58. A third fold point 76 is spaced from first fold point a distance approximately equal to the collapsed length of filter apparatus 10 such that third fold point 76 is located adjacent the second fold point 74 in a collapsed state. A fourth fold point 78 is located approximately equidistant between second fold point 74 and third fold point 76. First portion 80 of upper frame member 58 extends between first fold point 72 and third fold point 76; second portion 82 of upper frame member 58 extends between third fold point 76 and fourth fold point 78; third portion 84 of upper frame member 58 extends between second fold point 74 and fourth fold point 78.

Fold points 70 on lower frame member 60 are similarly located. Lower frame member 60 has a first fold point 72' located at the junction between lower frame member 60 and left frame member 62 and a second fold point 74' located at the junction of right frame member 64 and lower frame member 60. A third fold point 76' is spaced from first fold point a distance approximately equal to the collapsed length of filter apparatus 10 such that third fold point 76' is located adjacent the second fold point 74' in a collapsed state. A fourth fold point 78' is located approximately equidistant between second fold point 74' and third fold point 76'. First portion 80' of lower frame member 60 extends between first fold point 72' and third fold point 76'; second portion 82' of lower frame member 60 extends between third fold point 76' and fourth fold point 78'; third portion 84' of lower frame member 60 extends between second fold point 74' and fourth fold point 78'.

In the collapsed state illustrated in FIG. 3, the overall height of filter apparatus 10 is not significantly greater than the overall height of the filter in the expanded state. In a preferred embodiment, the overall height of filter apparatus 10 is the same in both the collapsed and expanded states. First portion 80, 80' has a length approximately equivalent to the collapsed length of filter apparatus 10. Second portion 82, 82' and third portion 84, 84' are approximately equidistant. Second portion 82 abuts third portion 84 which abuts left frame member 62. Similarly, second portion 82' abuts third portion 84' which abuts right frame member 64.

Referring to FIG. 4, an alternate orientation of fold points 70 is illustrated. Each the upper frame member 58 and the lower frame member 60 has six fold points such that in the collapsed state each the upper frame member 58 and the lower frame 60 forms a U-shape as illustrated in FIG. 4.

In operation, filter apparatus 10 is shipped and stored in a collapsed state as shown in FIG. 3 (or in the alternate embodiment shown in FIG. 4). When ready for use, filter apparatus 10 is configured to an expanded state by pulling left frame member 62 and right frame member 64 in opposite directions, resulting in fold points 70 flexing, until upper frame member 58 and lower frame member 60 are approximately straight and parallel. The filter apparatus 10 is then placed in a modular frame fitted for the particular size of filter apparatus 10. It is unnecessary to secure filter apparatus 10 to the modular frame of the paint booth with clips. It is also unnecessary to use a rear supporting grid since the accordion design of the filter media 12 prevents collapse between upper frame member 58 and lower frame member 60.

An airstream containing undesired particles such as paint particles is pulled toward filter apparatus 10. The airstream passes through apertures 42 of first media member 34 and then through holes 52 of second media member 44, with the particles being deposited in various locations of first media member 34 and second media member 44. The filtered air may pass through one or more second stage filter systems— typically dense polyester weave filters—before the airstream, now substantially free of particles, passes through the exhaust of the filter unit into the environment. When filter apparatus 10 is full or loaded with particles, filter apparatus 10 is removed from the modular frame and may be collapsed by pushing left frame member 62 toward right frame member 58. Filter apparatus 10 can then be suitably disposed of.

Thus, the present invention is well adapted to carry out the objects and attain the ends and advantages mentioned as well as those inherent therein. While preferred embodiments of the present invention have been illustrated for the purpose of the present disclosure, changes in the arrangement and construction of parts and the performance of steps can be made by those skilled in the art, which changes are encompassed within the scope and spirit of the present invention as defined by the appended claims.

What is claimed is:

1. A filter apparatus for removing air entrained housing particulates that can be used in clipless relationship with a modular frame of a filter housing comprising:
    a collapsible filter media, the filter media having a periphery; and
    a continuous frame extending around and attached to the periphery of the filter media whereby the filter media and attached frame together can be lengthwise collapsed in an accordion fashion, the frame comprising a plurality of fold points at which the frame can be folded, the fold points located on an upper frame member which unattachedly spans a top of the filter media.

2. The apparatus of claim 1 wherein the fold points are located on a lower frame member which unattachedly spans a bottom of the filter media.

3. The apparatus of claim 2 wherein the frame further comprises a left frame member attached to a first end of the filter media and a right frame member attached to a second end of the filter media.

4. The apparatus of claim 3 configurable between a collapsed state and an expanded state whereby an overall height of the apparatus in the collapsed state is not significantly greater than the overall height of the filter in the expanded state.

5. The apparatus of claim 4 wherein in the collapsed state a portion of the upper frame member is substantially parallel to and abuts the left frame member and a portion of the lower frame member is substantially parallel to and abuts the right frame member.

6. The apparatus of claim 5 wherein in the collapsed state each of the upper frame member and the lower frame member forms an L-shape.

7. The apparatus of claim 5 wherein in the collapsed state each of the upper frame member and the lower frame member forms a U-shape.

8. The apparatus of claim 5 wherein the frame is formed of cardboard.

9. The apparatus of claim 8 wherein the filter media is corrugated.

10. The apparatus of claim 9 wherein the filter media comprises:
    a first media member constructed of corrugated paper having a plurality of apertures therethrough; and
    a second media member constructed of corrugated paper attached in a complementary relationship with the first media member.

11. A filter apparatus comprising:
    a collapsible filter media comprising:
        a first end;
        a second end substantially parallel to the first end, the first end and the second end each having an upper portion and a lower portion;
        a top; and
        a bottom substantially parallel to the top; and
    a frame for supporting the filter media comprising:
        an upper frame member connecting the upper portion of the first end to the upper portion of the second end, the upper frame member unattachedly spanning the top of the filter media;
        a lower frame member connecting the lower portion of the first end to the lower portion of the second end, the lower frame member unattachedly spanning the bottom of the filter media; and
        a plurality of fold points located on the upper frame member and on the lower frame member such that the upper frame member and the lower frame member can be folded to collapse the filter media lengthwise between the first end and the second end;
    a first media member constructed of corrugated paper having a plurality of apertures therethrough; and
    a second media member constructed of corrugated paper attached in a complementary relationship with the first media member.

12. The apparatus of claim 11 wherein the frame further comprises a left frame member attached to the first end of the filter media and a right frame member attached to the second end of the filter media.

13. The apparatus of claim 12 wherein the frame is continuous.

14. The apparatus of claim 11 configurable between a collapsed state and an expanded state whereby an overall height of the apparatus in the collapsed state is not significantly greater than the overall height of the filter in the expanded state.

15. The apparatus of claim 14 wherein in the collapsed state a portion of the upper frame member is substantially parallel to and abuts the left frame member and a portion of the lower frame member is substantially parallel to and abuts the right frame member.

16. The apparatus of claim 15 wherein in the collapsed state each of the upper frame member and the lower frame member forms an L-shape.

17. The apparatus of claim 15 wherein the upper frame member and the lower frame member form a U-shape.

18. The apparatus of claim 11 wherein the frame is formed of cardboard.

19. The apparatus of claim 11 wherein the filter media is accordion-shaped paper.

20. The apparatus of claim 11 wherein the filter media comprises:
    a first media member constructed of corrugated paper having a plurality of apertures therethrough; and
    a second media member constructed of corrugated paper attached in a complementary relationship with the first media member.

21. A filter apparatus configurable between a collapsed state and an expanded state comprising:
    a corrugated filter media for removing particulates from an airstream, the filter media having a periphery, the periphery comprising a first and a second end, the filter media collapsible between the first end and the second end; and
    a continuous frame for supporting the filter media extending around the periphery of the filter media and connecting to the first end and the second end of the filter media, the frame having a plurality of fold points at which the frame can be folded such that the frame together with the filter media are lengthwise collapsible in an accordion fashion, whereby an overall height of the filter apparatus in the collapsed state is not significantly greater than the overall height of the filter apparatus in expanded state.

22. The apparatus of claim 21 wherein the fold points are located on an upper frame member which unattachedly spans a top of the filter media and on a lower frame member which unattachedly spans a bottom of the filter media.

23. The apparatus of claim 21 wherein in the collapsed state a portion of the upper frame member is substantially parallel to and abuts the left frame member and a portion of the lower frame member is substantially parallel to and abuts the right frame member.

24. The apparatus of claim 23 wherein in the collapsed state each of the upper frame member and the lower frame member forms an L-shape.

25. The apparatus of claim 23 wherein in the collapsed state each of the upper frame member and the lower frame member forms a U-shape.

26. The apparatus of claim 21 wherein the frame is formed of paper.

27. The apparatus of claim 21 wherein the filter media comprises:

a first media member constructed of corrugated paper having a plurality of apertures therethrough; and a second media member constructed of corrugated paper attached in a complementary relationship with the first media member.

28. The apparatus of claim 11 wherein the frame collapses in an accord ion fashion such that in a collapsed state the filter media is entirely positioned between the first end and the second end of the filter media.

29. The apparatus of claim 11 wherein the frame is adapted for use in a clipless relationship with a modular frame of a filter housing.

30. The apparatus of claim 21 in the expanded state is adapted for use in a clipless relationship with a modular frame of a filter housing.

* * * * *